United States Patent [19]

Takeda et al.

[11] Patent Number: 5,459,379
[45] Date of Patent: Oct. 17, 1995

[54] METHOD FOR OPERATING POWER WINDOW APPARATUS HAVING SAFETY DEVICE

[75] Inventors: Hitoshi Takeda; Keiichi Tajima; Toru Nakayama, all of Shizuoka, Japan

[73] Assignee: Koito Manufacturing Co., Ltd., Tokyo, Japan

[21] Appl. No.: 89,567

[22] Filed: Jul. 12, 1993

[30] Foreign Application Priority Data

Oct. 21, 1992 [JP] Japan .................... 4-305856

[51] Int. Cl.⁶ .................................. E05F 15/10
[52] U.S. Cl. .................. 318/469; 49/28; 318/266; 318/286; 318/434
[58] Field of Search .................. 318/256, 264, 318/265, 266, 267, 286, 434, 466, 467, 468, 469; 388/903, 907.5, 912; 49/26, 28; 340/825.57, 825.62, 825.65

[56] References Cited

U.S. PATENT DOCUMENTS

| 4,468,596 | 8/1984 | Kinzi et al. . |
| 4,608,637 | 8/1986 | Okuyama et al. . |
| 4,983,896 | 1/1991 | Sugiyama et al. ............ 318/286 |
| 5,334,876 | 8/1994 | Washeleski et al. ............ 318/469 X |

FOREIGN PATENT DOCUMENTS

| 3329717 | 4/1984 | Germany . |
| 3303590 | 8/1984 | Germany . |
| 3829405 | 3/1990 | Germany . |

*Primary Examiner*—Bentsu Ro
*Attorney, Agent, or Firm*—Sughrue, Mion, Zinn, Macpeak & Seas

[57] ABSTRACT

A method for operating power window apparatus with a safety device which stops the closing operation of the window in response to the detection of an object-caught state, which prevents the incomplete close of the window, and can accurately detect the object-caught state. The opening/closing position of the window is detected by counting pulses generated as the window moves. A region where a safety control can be carried out is determined on the basis of the detected opening/closing position. When the window reaches a position near a position where the window is fully closed, the count indicative of the opening/closing position detector is reset. The resetting operation is carried out so that a time point where the relative speed of the window is reduced is set at the fully closed position of the window.

6 Claims, 2 Drawing Sheets

1

METHOD FOR OPERATING POWER WINDOW APPARATUS HAVING SAFETY DEVICE

BACKGROUND OF THE INVENTION

The present invention relates to a method for operating a power window apparatus for automatically opening and closing a window of an automobile, and more particularly to a method for operating a power window apparatus with a safety device which carries out a safety control operation when the hand, neck, etc., of a driver or passenger is caught between the window glass and the sash.

Recent automobiles are often provided with a power window apparatus for automatically opening and closing the windows. In such a power window apparatus, however, a dangerous situation occurs if the hand or neck of a passenger is accidentally caught between the window and the sash. To cope with this situation, a safety device has been proposed. The safety device operates such that when it detects a state where an object, for example, the hand of a passenger or driver, is caught between the window glass and the sash, the movement of the window glass is stopped or the window glass is forcibly moved in the opening direction.

In this apparatus, a detector for detecting the rotational speed of the motor used for driving the window glass is provided. When an object is caught in the window glass, the motor speed is reduced. The motor speed detector detects this reduction of the motor speed. When the speed reduction is detected, the safety device forcibly opens the window, that is, carries out the safety control operation, so as to release the caught object.

In a situation where the window glass approaches the fully closed position and comes into contact with the sash, for example, and the motor speed is reduced, the safety device sometimes mistakenly recognizes this normal occurrence of speed reduction as an object being caught in the window, and mistakenly carries out the safety control operation. In this case, the window is left incompletely closed.

To cope with this problem, a safety control mode disabling region is provided. In this region, the safety control mode is disabled in a region just before the window is completely closed. With the provision of the safety control mode disabling region, complete closure of the window glass is possible.

The motor of the power window apparatus is provided with a damper for damping impacts applied to the window. Accordingly, after the window is fully closed, the rotation of the motor continues for a time period corresponding to the quantity of deformation of the damper. Therefore, if the fully closed state of the window glass is detected on the basis of the rotation of the motor, the detected position of the fully closed state of the window glass exceeds the actual position, i.e., it is deviated from the latter.

If the deviation is a fixed quantity, it is easy to obviate the adverse effects caused by such deviation. In actuality, however, the deviation varies depending on ambient conditions, for example, temperature. When the deviation varies, the safety control mode disabling region varies since it is established on the basis of the fully closed position of the window. If an object-caught state is erroneously detected as the result of such deviation, the problem of the window being left in an incompletely closed state again occurs.

SUMMARY OF THE INVENTION

Accordingly, an object of the present invention is to provide a method for operating a power window apparatus with a safety device which is able to completely close the window in a reliable manner without erroneous detection of an object-caught state.

In accordance with the above and other objects, the invention provides a method for operating a power window apparatus with a safety device including steps of detecting the opening/closing position of the window by counting pulses generated in response to movement of the window, detecting a region where a safety control operation can be carried out on the basis of the detected opening/closing position, detecting when the window has reached a position near the position where the window is fully closed, and resetting the count indicative of the position of the window when the position near the fully closed position has been reached.

DESCRIPTION OF THE PREFERRED EMBODIMENTS

Preferred embodiments of a method for operating a power window apparatus with a safety device constructed according to the present invention will be described with reference to the accompanying drawings.

Figure 1:
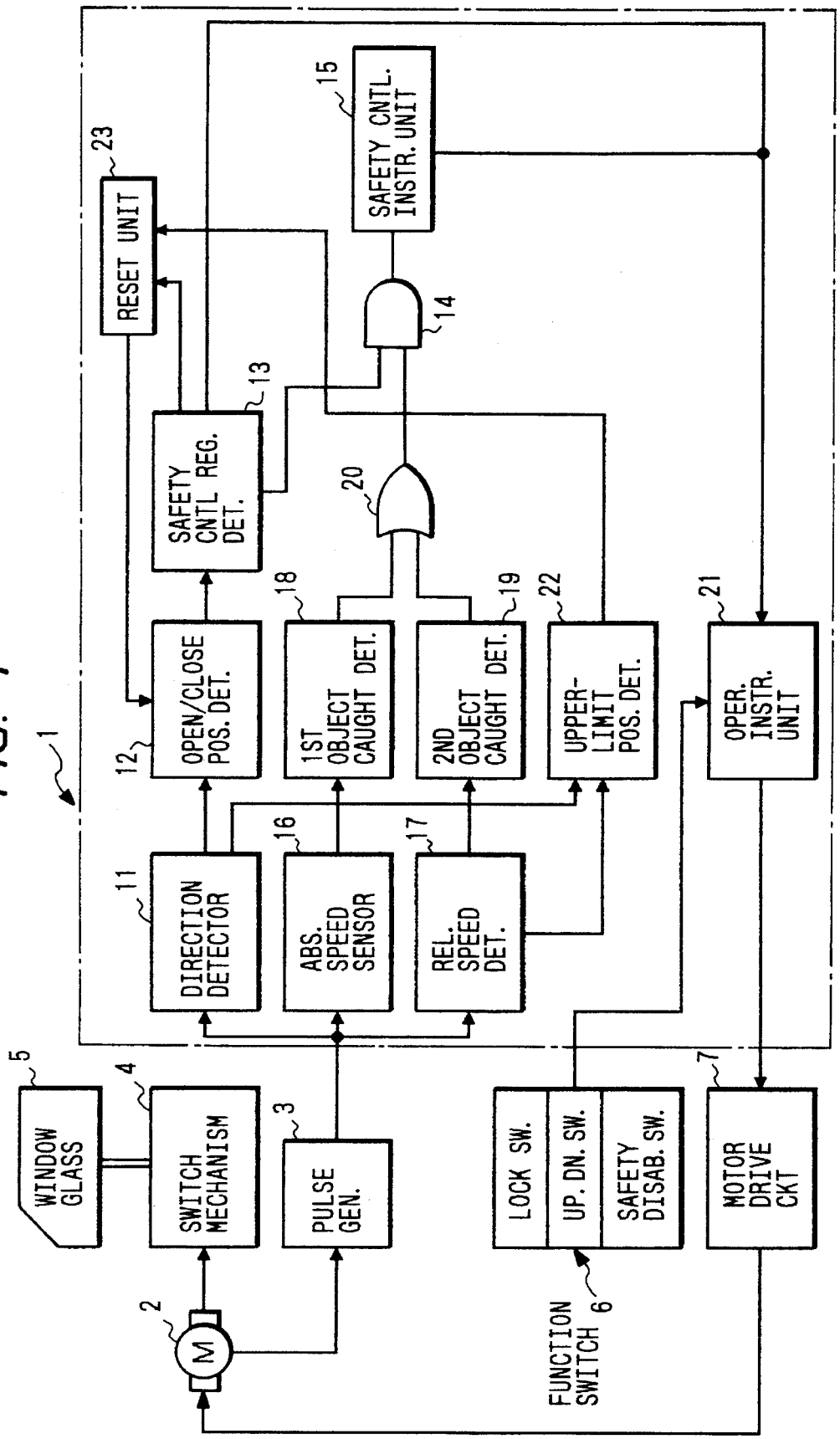
FIG. 1 is a block diagram showing a control system of a power window apparatus constructed according a preferred embodiment of the present invention.

FIG. 1 is a block diagram showing a control system of a power window apparatus operating according the preferred embodiment of the present invention. In the figure, a microcomputer 1 receives pulse signals from a pulse generator 3 attached to a motor 2 employed as a drive source for the power window apparatus. The motor 2 vertically moves a window glass 5 for opening and closing as instructed through a switch mechanism 4. A function switch 6, for selecting the opening or closing of the window glass, applies a select signal to the microcomputer. The microcomputer 1 applies control signals to a motor drive circuit 7, which in turn controls the rotational direction of the motor 2.

The pulse generator 3 is implemented with a disc magnet fixed to the rotating shaft of the motor and a pair of Hall elements disposed around the magnet in a state where the elements are angularly spaced by 90° in the circumferential direction. The Hall elements sense the magnetic poles of the magnet to generate currents in the form of pulse signals of a frequency corresponding to the motor speed.

The function switch 6 includes a lock switch, up/down switch, a safety control mode disabling switch, and the like.

The microcomputer 1 includes a system for detecting when the window glass is in a safety control region from the state of the opening/closing operation, and a system for detecting an object-caught state.

The system for detecting the safety control region includes a direction detector 11, which detects the rotational direction of the motor by sensing the period of the pulse signals output from the pulse generator 3 and the direction of movement of the window glass associated therewith. An opening/closing position detector 12 is implemented with an up/down counter, for example. In a state where the window is fully closed, that is, the state where the motor is locked, the count of the counter is set to "0". The counter counts the pulse signals generated when the motor forwardly turns in the negative direction to close the window glass. The counter also counts the pulse signals generated when the motor reversely turns in the positive direction to open the window glass. The resultant count of the counter indicates the opening/closing position of the window glass.

A safety control region detector 13 responds to the output signal of the opening/closing position detector 12 to detect a safety control region exclusive of a safety control mode disabling region. The safety control region is established within a predetermined range from the fully closed position of the widow. A safety control operation is allowed only within the safety control region.

The output signal of the safety control region detector 13 is input to a first input terminal of an AND gate 14 and also to an operation instruction unit 21. The operation instruction unit 21 carries out an operation which is selected depending on the operation of the function switch 6.

The system for detecting the object-caught state includes an absolute speed sensor 16 for detecting the motor speed by sensing the time intervals of the signals output from the pulse generator 3, and a first object-caught detector 18 for detecting the object-caught state by detecting a reduction of the detected motor speed. The motor speed reduction is detected by comparing the sensed motor speed with a reference value. The combination of a relative speed detector 17 and a second object-caught detector 19 are connected in parallel with the combination of the absolute speed sensor 16 and the first object-caught detector 18. The relative speed detector 17 detects a change of the opening/closing speed of the window glass, i.e., a relative speed, from the ratios of the time intervals of the pulse signals. The second object-caught detector 19 detects the object-caught state by detecting a reduction of the detected motor speed. The motor speed reduction is detected by comparing the sensed motor speed with a reference value.

The output signals of the first and second object-caught detectors 18 and 19 are applied to a second input terminal of the AND gate 14 by way of an OR gate 20. The output signal of the AND gate 14 is input to a safety control instruction unit 15. When receiving the object-caught detect signal, the safety control instruction unit 15 controls the operation instruction unit 21 to carry out a safety control operation. In the safety control operation, in this embodiment, the window glass is moved 12 cm from the present position of the window in the opening direction.

An upper-limit position detector 22 receives the output signal of the direction detector 22 and the output signal of the speed detector, or the relative speed detector, and detects the fully closed position of the window, i.e., the upper-limit position. When the relative speed decreases below a preset level during the course of the closing movement of the window, the upper-limit position detector 22 detects the window position in this transitional state, as the upper-limit position, and outputs a detection signal.

A reset unit 23 receives the output signal of the upper-limit position detector 22 and the output signal of the safety control region detector 13, and corrects the detected value from the opening/closing position detector 12.

In the power window apparatus thus constructed, when the motor 2 starts to turn, the pulse generator 3 generates pulse signals, which are applied to the microcomputer 1. The absolute speed sensor 16 detects the absolute speed of the window glass using the signal intervals of the pulse signals. When the absolute speed decreases below the reference value, the first object-caught detector 18 produces an object-caught signal. The relative speed detector 17 detects the relative speed of the window in response to a change of the signal intervals of the pulse signals. When the relative speed decreases below a predetermined value, the second object-caught detector 19 produces an object-caught signal.

The direction detector 11 detects the rotational direction of the motor 2, i.e., the direction of window movement. In the opening/closing position detector 12, the counter contained therein counts up or down the pulse signals in accordance with the movement direction. The resultant count of the counter is indicative of the present position of the window. The safety control region detector 13 determines whether or not the present position of the window is within the safety control region on the basis of the output signal of the opening/closing position detector 12. If it is within the safety control region, the output signal is applied to the AND gate 14.

The absolute and relative speeds thus detected are input to the AND gate 14 through the OR gate 20. The AND gate 14 is enabled by the signal from the safety control region detector 13 to allow the absolute and relative speeds to be applied to the safety control instruction unit 15. Upon receipt of this signal, the safety control instruction unit 15 operates the operation instruction unit 21, thereby effecting the safety control operation. In the safety control operation, the operation instruction unit 21 inverts the polarity of the current fed to the motor 2 through the motor drive circuit 7. The motor 2 is reversely turned to move the window a preset distance (12 cm) in the opening direction, and then stopped. The result is to allow the object caught by the window to be extracted therefrom, and hence to secure safety.

Figure 2:
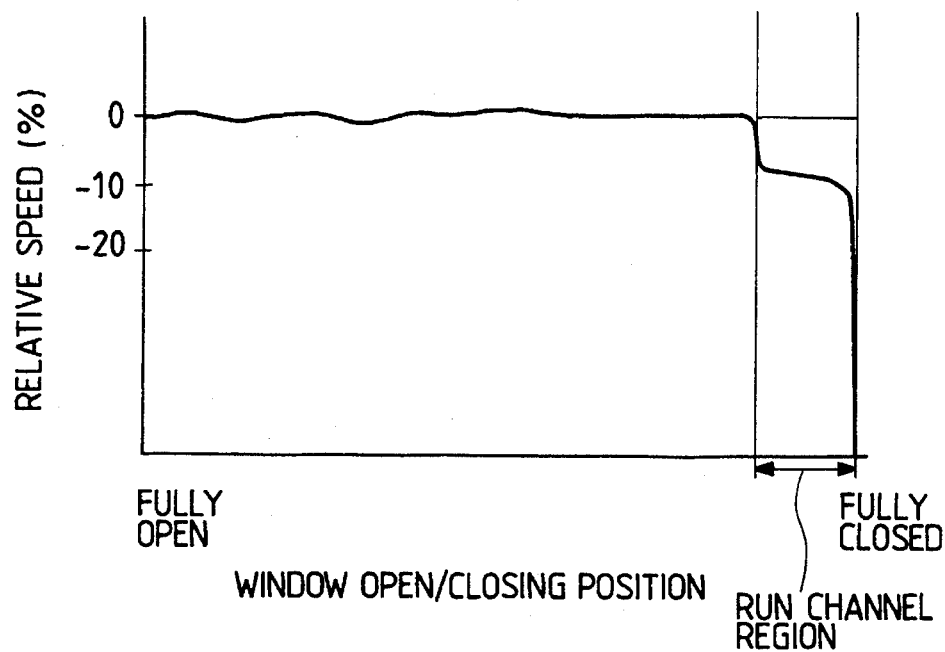
FIG. 2 is a graph showing the relationship between the relative speed and the opening/closing position of a window glass.

When the window glass reaches a region (run channel region) close to the fully closed position where the window glass comes into contact with the sash, weather stripping, and the like, the motor rotation is impeded to reduce its speed. A variation of the relative speed with respect to the position of the window glass when the window is closed is illustrated in FIG. 2. As seen from the graph, the relative speed abruptly decreases in the channel region.

Figure 3:
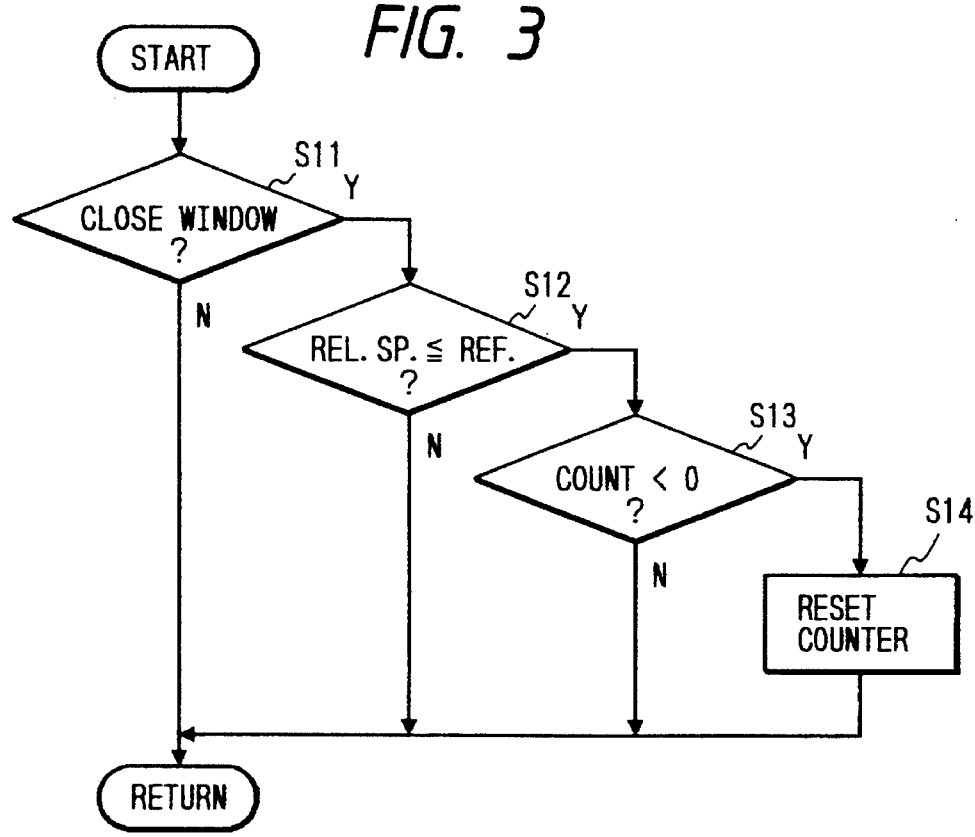
FIG. 3 is a flowchart showing the resetting operation of a reset unit used in the control system of FIG. 1.

The upper-limit position detector 22 operates as shown in FIG. 3. As shown therein, as the closing movement of the window glass progresses (S11), the relative speed decreases below a preset reference value (S12). The upper-limit position detector 22 recognizes the position of the window in this transitional state as the upper-limit position, and outputs an upper-limit position detect signal to the reset unit 23.

The reset unit 23 applies a reset signal to the opening/closing position detector 12. When the count of the counter contained in the position detector 12 is negative (S13), the detector 12 resets the counter to "0" in response to the reset signal (S14). In this way, the upper-limit position is corrected, and subsequently the count ("0") of the counter is used as the upper limit position or the fully closed position.

With the provision of the reset unit 23, in a situation where the resilient force of the damper of the motor is changed owing to an ambient temperature change, or the motor torque is changed owing to a variation of the motor drive voltage, the point where the speed of the window glass is reduced below a preset value, i.e., the window glass reaches the run channel region, is detected and the count of the counter is reset to "0". This count is set as the upper-limit position. Subsequently, the position where the window glass enters the run channel region is recognized as the fully closed position.

In the conventional approach, when the count of the counter is negative, the negative value is unconditionally reset to "0", and this reset value is set as the upper-limit position. Accordingly, when the window glass is actually fully closed as already described, the damper is resiliently deformed. After the window is fully closed, the motor still continues to turn until the motor is locked. The upper-limit position is corrected by the quantity of the further turning of the motor to shift the upper-limit position to the upper side.

On the other hand, in the present embodiment, the fully closed position recognized by the opening/closing position detector 12 is never shifted to the upper side of the actual fully closed position of the window, but is surely set within the run channel region. Accordingly, there never occurs such an unwanted situation that the safety control mode disabling region, which is set up on the basis of the fully closed position, is substantially reduced. A region including a part of the run channel region can reliably be set as a safety control mode disabling region. Therefore, the power window apparatus of the invention is free from the undesirable situation that the arrival of the window glass at the run channel region is mistakenly recognized as an object-caught state and the window is left incompletely closed.

The fully closed position of the window is not recognized before the window glass reaches the run channel region. An additional unwanted situation that the safety control mode disabling region is overly expanded will not take place.

The reset unit produces a reset signal on the basis of the result of detecting a safety control region with the safety control region detector. Accordingly, the reset unit does not produce a reset signal for correcting the upper-limit position when the motor speed is reduced in the safety control region.

As described above, the count indicative of the position of the window glass is reset at a time point where the window glass reaches a position near the fully closed position of the window. The safety control region is detected on the basis of the reset count value. Even when the actual fully closed position of the window glass is not coincident with the drive source (motor) in its operation, the power window apparatus can precisely recognize the current position of the window glass, particularly the fully closed position of the window glass. Accordingly, the safety control mode disabling region can be detected correctly. No incomplete closing of the window takes place. Further, the object-caught state can be detected with a high accuracy.

What is claimed is:

1. A method for operating a power window apparatus having a safety device for carrying out a safety control operation upon detection of a state where an object is caught in a window driven by a motor, comprising the steps of:

generating pulses in response to movement of said window and counting said pulses to produce a count indicative of a present position of said window;

detecting when said window is in a safety control region of movement of said window where a safety control operation is permitted to be carried out by comparing said count indicative of said present position of said window with a reference value;

when said window is in said region of movement where a safety control operation is permitted, detecting a speed of movement of said window and performing said safety control operation when said speed of movement decreases below a predetermined value;

detecting when said window reaches a predetermined position near a position where said window is fully closed based on said detected speed, said predetermined position corresponding to an upper limit of said safety control region;

disabling said safety control operation when said window is in a region between said predetermined position and said position where said window is fully closed; and resetting said count when said predetermined position is detected in said detecting step.

2. The method of claim 1, wherein said predetermined position is a position where said window engages a structure which impedes movement of said window so as to reduce said speed of said window.

3. The method of claim 1, wherein said step of generating pulses comprises generating electrical pulses in response to rotation of said motor driving said window.

4. The method of claim 1, wherein said step of resetting said count comprises resetting said count to a zero value.

5. The method of claim 4, wherein said said count is reset when said count is negative.

6. A method for operating a power window apparatus having a safety device for carrying out a safety control operation upon detection of a state where an object is caught in a window driven by a motor, comprising the steps of:

generating pulses in response to movement of said window and counting said pulses to produce a count indicative of a present position of said window;

detecting when said window is in a region of movement of said window where a safety control operation is permitted to be carried out by comparing said count indicative of said present position of said window with a reference value;

when said window is in said region of movement where a safety control operation is permitted, detecting a speed of movement of said window and performing said safety control operation when said speed of movement decreases below a predetermined value;

detecting when said window reaches a predetermined position near a position where said window is fully closed;

disabling said safety control operation when said window is in a region between said predetermined position and said position where said window is fully closed; and resetting said count when said predetermined position is reached, wherein said step of generating pulses comprises generating electrical pulses in response to rotation of said motor driving said window, and wherein said step of detecting a speed of movement of said window and performing a safety control operation when said speed of movement decreases below a predetermined value comprises:

detecting an absolute speed of said motor by detecting a pulse interval of said pulses;

comparing the detected absolute speed with a first reference value;

detecting a relative speed of said motor by detecting an on/off ratio of said pulses;

comparing the detected relative speed with a second reference value; and performing said safety control operation when either said detected absolute speed falls below said first reference value or said detected relative speed falls below said second reference value.

* * * * *